United States Patent
Hodges et al.

(10) Patent No.: US 12,184,341 B2
(45) Date of Patent: Dec. 31, 2024

(54) QUANTUM PROBABILITY ENCODING FOR COMMUNICATION SYSTEMS

(71) Applicant: General Dynamics Mission Systems, Inc., Fairfax, VA (US)

(72) Inventors: Todd Hodges, Fairfax, VA (US); Glen Uehara, Fairfax, VA (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 127 days.

(21) Appl. No.: 18/166,271

(22) Filed: Feb. 8, 2023

(65) Prior Publication Data
US 2024/0267130 A1    Aug. 8, 2024

(51) Int. Cl.
*H04B 10/00* (2013.01)
*H04B 10/079* (2013.01)
*H04B 10/532* (2013.01)
*H04B 10/70* (2013.01)

(52) U.S. Cl.
CPC ........... *H04B 10/70* (2013.01); *H04B 10/079* (2013.01); *H04B 10/532* (2013.01)

(58) Field of Classification Search
CPC .... H04B 10/70; H04B 10/079; H04B 10/532; H04B 10/40; H04B 10/2507; H04B 10/516; H04J 14/06; H04J 14/04; H04L 9/0858; H04L 9/0852; H04L 9/0869; H04L 9/0855

USPC ....... 398/140, 141, 158, 159, 183, 184, 185, 398/186, 187, 188, 189, 192, 193, 194, 398/135, 136, 65, 152, 25, 137, 138, 139; 380/255, 256, 278, 277, 44

See application file for complete search history.

(56) References Cited

U.S. PATENT DOCUMENTS

| | | | |
|---|---|---|---|
| 8,983,303 B2 * | 3/2015 | Meyers | B82Y 10/00 |
| | | | 398/140 |
| 2019/0028271 A1 * | 1/2019 | Röhsner | H04L 9/0852 |

\* cited by examiner

*Primary Examiner* — Hanh Phan
(74) *Attorney, Agent, or Firm* — Lorenz & Kopf, LLP

(57) ABSTRACT

The quantum communication system conveys information by exploiting quantum properties of photon streams. A photon source producing a pair of spatially separated and polarization-entangled photon streams is used. The pair collectively exist in a quantum superposition state by virtue of their mutual entanglement. An encoder establishes a modulation control signal corresponding to the information to be conveyed. An optical quantum circuit is placed in the path of one of the pair of streams, so that the first stream passes through it. The optical quantum circuit alters the quantum polarization state of the photon passing through it based on the control signal. In this way information is encoded into quantum probability distributions of the superposition state through quantum parallelism and quantum interference, whereby information is conveyed in the photon streams.

15 Claims, 3 Drawing Sheets

QUANTUM PROBABILITY ENCODING FOR COMMUNICATION SYSTEMS

TECHNICAL FIELD

This disclosure relates generally to communication systems and more particularly to a quantum probability encoding technique that allows messages to be quantum-encoded in and carried by a propagating stream of entangled photons.

BACKGROUND

This section provides background information related to the present disclosure which is not necessarily prior art.

Communication systems today rely heavily on digital modes and computer networking. In classical digital information systems, binary digits are used to represent the digital data. Ultimately these binary digits are represented by the electrical charge state of a nano-scale transistors embodied in silicon. In such classical systems the binary digits correspond to the on-off state of switches, implemented by transistor logic circuits. In these classical systems the binary digits have only two valid states: on or off, and thus can express only two values 1 or 0, in the alternative.

There has been considerable interest in quantum computing and quantum communication, yet there are numerous technological hurdles. In theory, quantum computers should be able to solve some problems better than classical systems. However, implementing such systems has proven to be quite challenging. Similarly, quantum techniques for conveying information could prove very useful. However, today quantum communication systems are lacking many of the fundamental tools needed to make this possible.

SUMMARY

Disclosed here is a quantum communication technology that exploits quantum parallelization and interference properties of polarization-entangled photons. The disclosed quantum communication system can be used to send messages that have been encoded in the probability states of the entangled photons. The disclosed system may be used to augment classical communication systems by adding quantum communication messaging to the communication stream in a seamless way which does not interfere with the classical system.

In one aspect, a quantum communication system for conveying information by exploiting quantum properties of photon streams is disclosed. A photon source produces first and second spatially separated and entangled photon streams, where the streams are entangled with respect to polarization. These first and second streams collectively existing in a quantum superposition state by virtue of their mutual entanglement;

An encoder establishes a modulation control signal corresponding to the information to be conveyed.

An optical quantum circuit is placed in the path of the first stream so the first stream passes through it. The optical quantum circuit is operable to alter polarization of the first stream based on the control signal, thus encoding information into quantum probability distributions of the superposition state, whereby information is conveyed in the photon streams. In one embodiment, as disclosed, an electro-mechanical device is used to alter polarization.

In another aspect, a method of conveying information in photon streams is disclosed. First and second spatially separated and entangled photon streams are produced, such that the streams are entangled with respect to polarization. The first and second streams collectively existing in a quantum superposition state by virtue of their mutual entanglement.

A modulation control signal is generated corresponding to the information to be conveyed.

The polarization of the first stream is optically altered based on the control signal, thus encoding information into quantum probability distributions of the superposition state, whereby information is conveyed in the photon streams.

BRIEF DESCRIPTION OF THE DRAWINGS

The drawings described herein are for illustrative purposes only of selected embodiments and not all possible implementations. The particular choice of drawings is not intended to limit the scope of the present disclosure.

DETAILED DESCRIPTION

Some Quantum Mechanics Fundamentals

Figure 1:
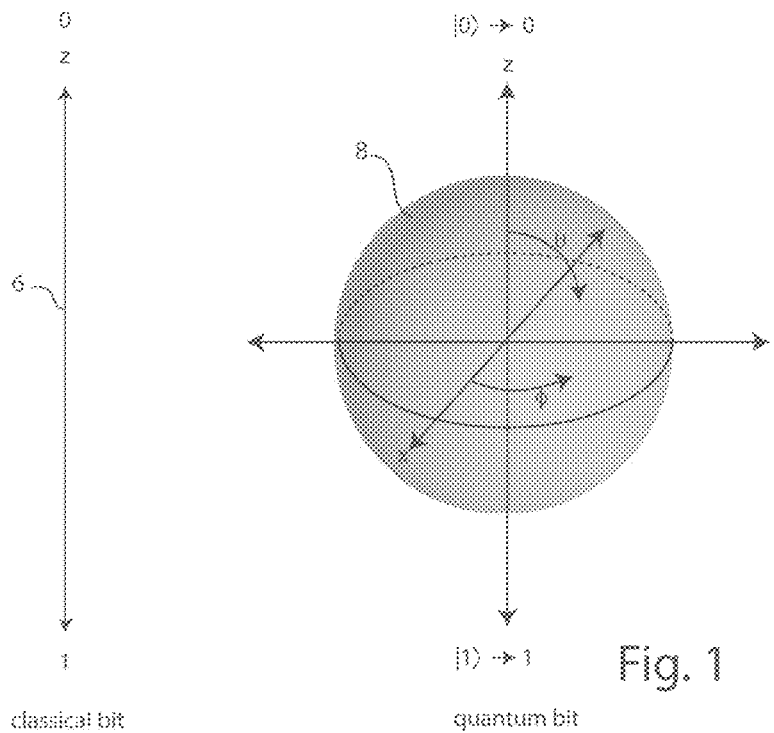
FIG. 1 is a graphical comparison of the classical binary digit (bit) with the quantum digits (qubits), using a Bloch sphere representation of different possible qubit states.

Quantum technology relies on manipulating quantum mechanical properties of suitable objects, typically subatomic particles. Essentially, meaning is ascribed to different quantum states. As will be explained, there is a considerable difference between the quantum world and the 1 and 0 binary logic of the classical world.

In the quantum world, the 1 and 0 binary logic of the classical world is retained, but the requirement that a state can be only 1 or 0 is abolished. In the quantum world, both states of 0 and 1 can exist at the same time. Thus the quantum state is a superposition of two classical states. Quantum digits are called qubits, to distinguish them from classical binary digits or bits. While the ability to store both states at the same time may seem counterintuitive, it its quite natural on the subatomic scale.

By way of example, envision a subatomic arrangement where a free electron finds itself simultaneously attracted to the nuclei of two like atoms A and B, as a consequence of having been positioned nearly equidistant to both. We might assign the binary state 1 when the electron is attracted to atom A, and the binary state 0 when the electron is attracted to atom B. However, following the forces of Nature, the electron will move to its lowest energy state, migrating to a position equidistant between atoms A and B. In such state, by our definition, the electron is in both binary states 1 and 0 at the same time. Any attempt to measure the electron's position will pull it in one direction or the other, and the 50-50 chance of being in both states vanishes. The measured outcome will be 1 or 0, depending on which way the electron moved when measurement was taken.

Qubits and Superposition

As noted above, classical digital communication systems represent information as binary digits or bits, which can store only the values 0 or 1. In the disclosed quantum communication system the classical bit is replaced by the quantum bit or qubit. Like the classical bit, a qubit can take two values 0 or 1, but unlike classical bits, the qubit can represent both values 0 and 1 at the same time. In this disclosure, to differentiate qubits from classical bits, qubit values have been represented using the bra-ket notation or Dirac notation, in which the 0 and 1 values are written between a vertical bar and an angle bracket, called a ket, as illustrated below:

$|0\rangle, |1\rangle$

To represent this notion of being in multiple states at the same time, physicists use a mathematical concept known as quantum superposition. Mathematically, the state of the qubit $\psi$ can be written as:

$$|\psi\rangle = \alpha|0\rangle + \beta|1\rangle$$

In the above equation the probability of being in the $|0\rangle$ state is a function of the amplitude factor $\alpha$; the probability of being in the $|1\rangle$ state is a function of the amplitude factor $\beta$. The probability values are determined by computing the normalized-square of the amplitude factors. The probability of measuring a 0 is $|\alpha|^2$, and the probability of measuring a 1 is $|\beta|^2$. Once measurement is performed, the qubit loses its superposition and continues to exist in its observed state as either 0 or 1.

Quantum superposition is a fundamental principle of quantum mechanics. It states that, much like waves in classical physics, any two quantum states can be added together, and the result will be another valid quantum state; and conversely, that every quantum state can be represented as a sum of two or more other distinct states.

Bloch Sphere

To get a sense of the quantum particle's ability to be in more than one state at a time, refer to FIG. 1, which compares the classical bit to the quantum qubit. The classical bit can exist in one of two states 0 or 1, as depicted at 6, where the two states are aligned with the opposite poles of the z-axis. In essence, the classical binary state is either up or down. There are no other choices possible.

By comparison, the quantum qubit can take on values $|0\rangle$ and $|1\rangle$ at opposite poles of the z-axis; but it can also take on vector values by circular rotation about the z-axis in the $\phi$ and $\theta$ directions to reach any point on the surface of the Bloch sphere 8 (an infinite number of points). Thus as FIG. 1 illustrates, the quantum qubit can simultaneously represent as many states as a quantum system can be designed to utilize. The classical qubit can only represent two states.

Measurement

As noted above, in its superposition state, the qubit represents all possible states permitted by the quantum mechanics governing the particle being exploited (in this case the photon). However, as soon as a measurement of the particle is taken, only one outcome resolves, based on the underlying probabilities governing the quantum superposition. Upon measurement, the superposition collapses. In effect, measurement collapses the qubit.

Some Properties of Photons

The photon, which exhibits both particle and wavelike behavior, is the force carrying particle responsible for electromagnetic waves. Photons, and the associated electromagnetic waves, propagate in free space at the speed of light. Electromagnetic energy covers a spectrum of frequencies (related to the energy level according to Planck's law) which include radio waves and visible light. Electromagnetic waves embody orthogonally coupled electric and magnetic fields and exhibit a property known as polarization. Customarily, the direction of the electric field is taken as the polarization direction.

Quantum Properties of the Disclosed Communication System

Entanglement

The disclosed communication system uses a propagating stream of entangled photons to represent a quantum superposition state. Specifically, pairs of entangled photons are generated, such that each entangled pair represents a quantum superposition state.

The quantum superposition state is then modulated to carry a message in the entangled photon stream. In the disclosed system, photon polarization is selectively altered to move pairs of possible observable states and thereby encode a message within the quantum superposition state.

Successively generated pairs of entangled photons are propagated collectively to comprise a propagating photon stream (a propagating electromagnetic wave).

Parallelism

Quantum parallelism commonly refers to the ability of quantum computer to evaluate a function for multiple input values simultaneously. This can be achieved by preparing a quantum system in a superposition of input states and applying a unitary transformation that encodes the function to be evaluated. Thus, this unitary operator acts on the entire quantum superposition state. The resulting state encodes the function's output values for all input values in the superposition, allowing for the computation of multiple outputs simultaneously. This property is key to the speedup of many quantum algorithms.

In the disclosed quantum communication system, quantum parallelism is exploited in a different way. Quantum parallelism is embodied in the stream of entangled pairs of photons, which comprise a propagating photon stream and propagating electromagnetic wave. The quantum superposition state is encoded through operation of a rotational control unit, which alters the polarization state of the entangled pairs to modulate the propagating photon stream and electromagnetic wave with a quantum message. This quantum message travels with the propagating photon stream and electromagnetic wave. Although not required, the electromagnetic wave may also be classically modulated, using for example a pulse modulation scheme. Thus the disclosed quantum communication system can carry two entirely separate messages based on fundamentally different physical phenomena—the difference being one message uses classical binary representation whereas the other message uses a quantum representation.

Interference—a Fundamental Difference

In classical communication systems, information conveyed as binary digits is purely logical. The bits are simply values used to represent the message being communicated, and the underlying physics of how these values are stored is irrelevant.

In the disclosed quantum communication system, information is conveyed using qubits. Qubits exhibit a behavior known as interference that sets them apart from classical binary digits. By their very nature, qubits are tied to the underlying quantum physics governing the physical particles that embody the quantum system. The quantum particles interact with each other on a quantum level, and that interaction changes the probabilities of a qubit being in a certain state.

In the disclosed quantum communication system, the qubits are embodied as photons, and those photons exhibit constructive and destructive interference, which alter the α and β amplitudes associated with being in the |0⟩ and |1⟩ states. Specifically, the half-wave plate of the optical circuit is used to place one of the two photons from an entangled pair into a single photon superposition state. Mathematically, this causes the polarization state coefficients (α and β) to change through addition and subtraction, which leads to changes in the probabilities of observable states. In this regard, it bears mention that both photons in an entangled pair are propagated together along the propagation path from source to destination. This differs from other distributed entanglement systems where one photon of an entangled pair is transmitted to a destination, while the other photon of the entangled pair is retained at the source—the so-called Bob and Alice scenario. In such "holding" scenario, quantum memory devices are typically needed.

System Overview

Figure 2:
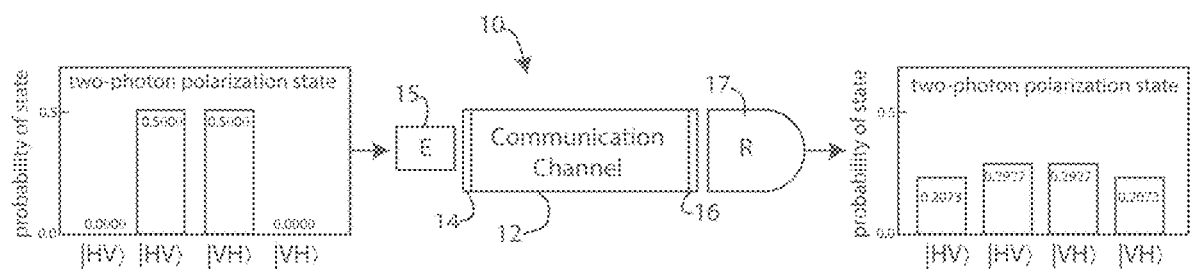
FIG. 2 is a block diagram of a communication system using the optical quantum circuit.

With reference to FIG. 2 the communication system 10 implements at least one communication channel 12 that is configured to carry a continuous stream of photons. The channel 12 includes an input node 14 to which an encoder 15 is coupled, and an output node 16 to which a receiver 17 is coupled. The input and output nodes may be coupled by a suitable waveguide, such as an optical cable, or the input and output nodes may be coupled by free space propagation between suitable antennas at the respective input and output nodes. In both guided wave and free space propagation embodiments, the continuous stream of photons collectively behave as a radiating electromagnetic wave which may be classically described by Maxwell's equations.

The stream of photons and the radiating electromagnetic wave which they embody differ from a classical electromagnetic radio wave or optical wave. In the disclosed system at least a portion of the photons in the stream are entangled quantum mechanically and the superposition of those entangled photons are encoded by encoder 15 to carry information that has been expressed by explicit modification of the quantum probability states of the entangled photons.

Entangled Photon Source

Figure 3A:
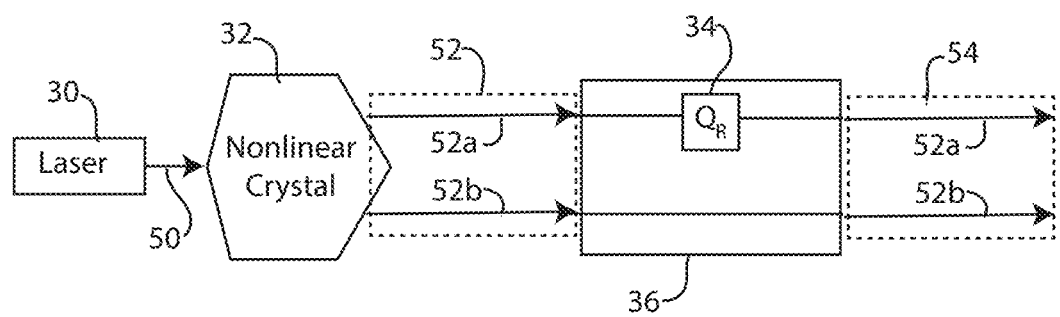
FIG. 3A is a diagram of an exemplary optical source for producing the entangled photon streams.
Figure 3B:
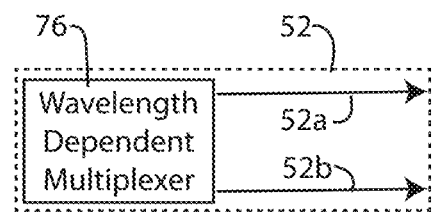
FIG. 3B is a block diagram illustrating a modification the optical source of FIG. 3A to include a wavelength division multiplexer.

In one embodiment the entangled photon source may be implemented by the optics system illustrated in FIG. 3. A stream of photons 50 is produced by laser 30 at a predetermined pump signal frequency and fed through a nonlinear optical medium, such as a nonlinear crystal 32. The nonlinear crystal may be implemented using, for example, lithium niobate, potassium diphosphate (KDP), or barium borate or beta-barium borate crystal. Other materials are also suitable. The crystal splits the photon stream 50 into two streams of entangled photons, shown collectively at 52. These two streams satisfy the conservation of energy and conservation of momentum principles, such that the combined energy and momenta of the two streams are equal to the energy and momentum of the laser pump signal. The two output streams are down-conversions of the pump signal; both output streams are lower in frequency than the pump signal frequency.

The process described above produces time-frequency entangled photons which are also correlated in polarization. As an alternative, shown in FIG. 3a, we generate photons that are hyper-entangled, meaning that they entanglement across more than one parameter (time-frequency and polarization in this case). A wavelength dependent multiplexer (WDM) is used to spatially separate the entangled pair along the two paths in box 52 of FIG. 3a. This would break the time-frequency entanglement at that point, which presents no problem since the polarization entanglement is maintained.

Optical Quantum Circuit and Rotational Control Unit

The output streams may be propagated through separate waveguides (e.g. fiber optic cables) so that one of the streams (stream 52a) is directed through a rotational control unit 34 while the other stream (stream 52b) is not. The rotational control unit 34 selectively imparts a polarization-encoded (via changes in the observable quantum polarization state probabilities) message stream 52a, such that the entangled streams, downstream of the rotational control unit as at 54, now carry a quantum-encoded message. Collectively the two waveguides and rotational control unit comprise the optical quantum circuit 36.

The rotational control unit 34 may be provided with an externally applied control signal at 68 which establishes the quantum rotational effect of the control unit 34 upon the stream fed through that leg of the optical quantum circuit. The effect of the optical quantum circuit is to alter the relative quantum phase of the superposition state of the entangled photon streams flowing through the two waveguides. In this sense the optical quantum circuit acts as an encoder which places information (supplied by the control signal 68) into the quantum superposition state of the entangled photon streams.

Figure 4:
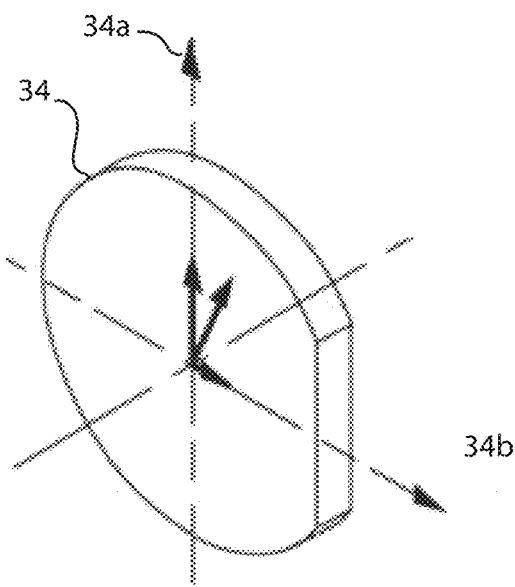
FIG. 4 is a diagram of an exemplary rotational control unit which uses a half-waveplate structure.

The rotational control unit 34 in its basic form may be implemented using a half-waveplate structure, an example of which is illustrated in FIG. 4. The half-waveplate structure is constructed of birefringent materials acting as a wave retarder that selectively alters the propagation velocity of light passing through. The structure defines a fast axis 34a and a slow axis 34b. Light passing through the fast axis travels more quickly than light passing through the slow axis, imparting a 90-degree change in polarization.

The rotational control unit may be electrically controlled in several ways. In one embodiment, an electrically controlled optical switch directs the photon stream either through a suitably positioned half-waveplate structure, or around it, to modulate the polarization of the photon stream in accordance with the encoded message.

Figure 5:
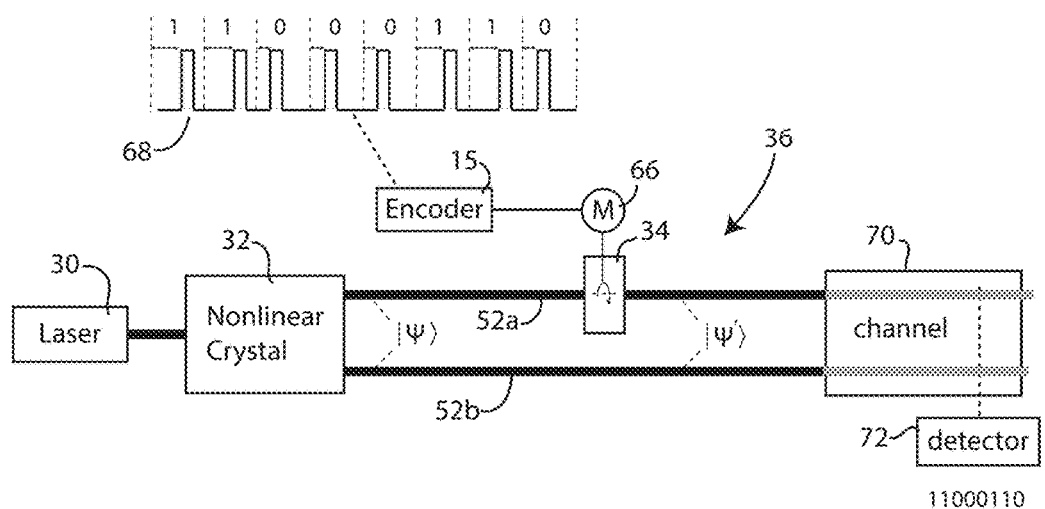
FIG. 5 is a diagram illustrating how classical encoding may be added.

In another embodiment, shown in FIG. 5, the half-waveplate is rotated about its axis by a motor 66 or other electro-mechanical system controlled through a software encoder 15 that encodes the probability distribution of the photons by changing the angle of the half-waveplate fast axis relative to the incident photon polarization axis. So, the incoming photons simply pass through the half-wave plate while the separate control unit changes the angle of the half-wave plate as a function of time. The software encoder 15, motorized electromechanical system 66 and half-waveplate thus define the operative components of the optical quantum circuit 36.

To place a quantum-encoded message into the photon stream, the message may be encoded as a series of control pulses using a suitable encoding scheme which is mapped to certain probability distributions of the measured states. By way of example, pulse-position modulation may be used. Of course, other modulation schemes may also be used.

Such an exemplary modulation signal is illustrated at 68. The illustrated modulation signal is a pulse-position modulated signal, using a first pulse position to represent a binary 1 and a second pulse position to represent a binary 0. The pulse positions are located relative to a fixed clock signal or timing signal, shown in dotted lines. The exemplary modulation signal represents a message payload comprising binary digits 11000110. It will be understood that this is merely an exemplary message for illustration purposes. Pulse-position modulated (PPM) and similar schemes may often use bit mapping schemes as well. For example, a pulse (or some signal) in a specific time slot maps to a long string of bits. Such schemes may be used in the disclosed system.

The modulation signal thus selectively imparts a polarization variation in photon stream 52a, which in turn modulates probability distribution of the polarization state of the entangled pair of photon streams. As illustrated in FIG. 5, the polarization-entangled photons exiting the nonlinear crystal 32 have superposition state vector $|\psi\rangle$. However after exiting the rotational control unit 34, the polarization-entangled pair have an altered superposition state vector $|\psi'\rangle$.

Reading the Quantum Encoded Message

The output of the optical quantum circuit may then be suitably fed to a destination node where the encoded quantum superposition state may be read using a suitable detector. In FIG. 5 the output of the optical quantum circuit 36 travels through a communication channel 70, at the end of which is located detector 72. Detector 72 reads the polarization state of the entangled photon stream(s) to retrieve the quantum encoded message. This act of reading collapses the entanglement, as discussed above.

Detection may be accomplished at 72 in different ways. A continuous detection scheme (e.g., using an optical parametric amplifier) may be used; or a discrete detection scheme (such as a pair of single photon detectors) may be used (see details below). To reconstruct the probability distribution, one straightforward method is to "count" how many pairs arrive in each state using a single-photon detector, which would involve auto-correlations and cross-correlations.

Continuous scheme: An optical parametric amplifier (OPA) is used as an interference-based amplifier that uses difference frequency generation via a spontaneous parametric down conversation (SPDC) process. The OPA has both phase and polarization requirements for amplification. So, by changing the probabilities of entangled photon states such that identical polarization states (e.g. HH or VV) are more favored or less favored, we can change the amplification of the output signal by a controllable amount. Effectively, this sets an upper bound on the amplification. Within that upper bound, other classical encoding schemes such as phase modulation may be employed.

Discrete Scheme: This scheme uses two single photon detectors, a delay line in one of the channels, time-tagging hardware, and a polarization-based beam splitter. The time of arrival for all of the photons may be recorded via the time-tagging hardware. Once all of the time of arrival data are received, the four potential states may be differentiated by using cross-correlation and auto-correlations. Cross-correlations can give the total number of HV and VH pairs. This looks like a peak in the cross-correlation plot that corresponds to a time offset equal to the channel delay time added previously. For the HH and VV states, the auto-correlation can be used in the same way to determine the total number of events for each state, with the delay line being used to identify photon 1 vs photon 2.

Because the entangled photon stream(s) are arriving in a continuous fashion, detection may be performed by looking at the data received at the detector in time bins to determine the total probability distribution for the measured photons in that bin. The results of such analysis may then be mapped to a set of classical bits corresponding to those produced by the encoder 15.

The quantum encoded message enjoys a security or anti-tampering benefit not found in classical systems. Reading the encoded quantum superposition state at the detector will collapse the superposition state. Thus, any attempt to read the entangled superposition state downstream of the detection event will be unsuccessful, as the superposition state no longer exists. If the quantum encoded message arrives at its intended destination, with the superposition state having already been collapsed, the recipient knows that the message has been intercepted prior to intended delivery. Specifically, the probability distribution would appear to be affected by more noise than what should be present in the communication channel. To the polarization entangled photons, interactions with the external environment are noise. This leads to depolarization of the photon pairs, which pushes the probability distribution of the observables to a flat distribution.

For a deeper understanding of how information may be encoded in the stream of polarization entangled photons, see the following half-waveplate derivation.

Half-Waveplate Derivation

For a pair of polarization entangled photons, the state vector in the linear polarization basis may be written as $$|\psi\rangle = \frac{1}{\sqrt{2}}(|HV\rangle + |VH\rangle) \quad \text{(Eq. 1)}$$

Passing one of the photons from the entangled pair through a linear optical device such as a half-waveplate, the superposition state will be altered due to quantum parallelism. A single photon passing through a half-waveplate will result in the following polarization dependent changes.

$$|H\rangle \rightarrow \cos 2\theta |H\rangle + \sin 2\theta |V\rangle \quad \text{(Eq. 2)}$$

$$|V\rangle \rightarrow \sin 2\theta |H\rangle + \cos 2\theta |V\rangle \quad \text{(Eq. 3)}$$

Where $\theta$ is the angle between the fast axis of the half-waveplate and the incident photon polarization. If the entangled photons are spatially separated and photon one from equation 1 is passed through a half-waveplate, then the new state vector is $$|\psi'\rangle = \frac{1}{\sqrt{2}}[(\cos 2\theta |H\rangle + \sin 2\theta |V\rangle)|V\rangle + (\sin 2\theta |H\rangle - \cos 2\theta |V\rangle)|H\rangle] \quad \text{(Eq. 4)}$$

Which simplifies to $$|\psi'\rangle = \frac{1}{\sqrt{2}}[\cos 2\theta(|HV\rangle - |VH\rangle) + \sin 2\theta(|VV\rangle + |HH\rangle)] \quad \text{(Eq. 5)}$$

As equation 5 shows, the result of one half-waveplate is the ability to move two pairs of possible observable states. The addition of a half-waveplate in the path of photon two, results in a different equation with the same properties as equation 5.

Adding Classical Modulation

If desired, the entangled photon stream, carrying information imparted by the operation of optical quantum circuit 36 with rotational control unit 34, can also be classically modulated to carry additional information. The continuous stream of photons flowing through the optical quantum circuit travels by guided wave or free space propagation in accordance with Maxwell's equations, as one or more electromagnetic waves at the frequency or frequencies produced by the laser pump and nonlinear crystal device.

Figure 6:
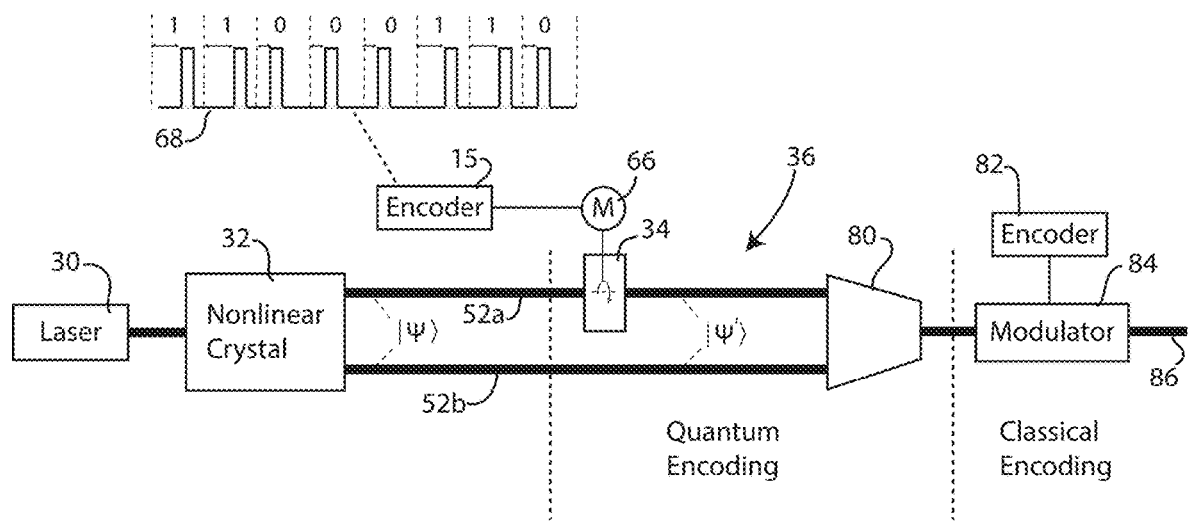
FIG. 6 is a diagram illustrating how classical modulation may be added to the circuit of FIG. 5.

Thus, these electromagnetic waves can serve as a carrier and may be modulated using classical modulation techniques which do not alter the polarization in a way that would collapse the quantum entanglement used to encode the quantum message. Such a system is shown in FIG. 6. In FIG. 6, the circuit of FIG. 5 has been augmented to add a combiner 80 so that the entangled photons from the quantum encoding system may be fed through a classical modulator 84, driven by a suitable software encoder 82. The photons themselves do not interact with each other when combined. They remain in their entangled state. Classical modulation can be implemented, for example by on-off continuous wave modulation (CW) or by other pulse modulation techniques, as these do not affect the polarization entanglement established by the nonlinear crystal 32. In FIG. 6, vertical dotted lines have been included to separate the quantum encoding portion from the classical encoding portion.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A quantum communication system for conveying information by exploiting quantum properties of photon streams, comprising:
    a photon source producing first and second spatially separated and entangled photon streams, the streams being entangled with respect to polarization;
    the first and second streams collectively existing in a quantum superposition state by virtue of their mutual entanglement;
    an encoder that establishes a modulation control signal corresponding to the information to be conveyed;
    an optical quantum circuit placed in the path of the first stream so the first stream passes through it;
    the optical quantum circuit being operable to alter polarization of the first stream based on the control signal, thus encoding information into quantum probability distributions of the superposition state, whereby information is conveyed in the photon streams.

2. The quantum communication system of claim 1 wherein the photon source is a laser supplying a stream of unentangled photons to a nonlinear crystal which produces the spatially separated and entangled photon streams.

3. The quantum communication system of claim 1 wherein the encoder converts the information to be conveyed into a series of impulses and the optical quantum circuit is controlled by the series of impulses.

4. The quantum communication system of claim 3 wherein the encoder employs pulse position modulation to develop the series of impulses.

5. The quantum communication system of claim 1 wherein the optical quantum circuit includes a half-waveplate that alters polarization of the first stream based on the control signal.

6. The quantum communication system of claim 5 wherein the half-waveplate includes an electro-mechanical system that rotates the half-waveplate based on the control signal.

7. The quantum communication system of claim 1 wherein the first and second photon streams are each substantially continuous.

8. The quantum communication system of claim 1 where the first and second photon streams define a propagating electromagnetic wave and wherein the system further comprises a modulator configured to modulate the electromagnetic wave without altering the quantum superposition state.

9. The quantum system of claim 1 further comprising a detector placed in a channel to receive at least one of the first and second photon streams and measure the quantum probability distributions, thereby extracting the information and collapsing the superposition state.

10. The quantum system of claim 9 wherein the detector employs a detection scheme selected from the group consisting of a continuous detection scheme and a discrete detection scheme.

11. The quantum system of claim 9 wherein the detector processes the photon streams in a plurality of time bins and determines the total probability distribution for the measured photons in each bin.

12. A method of conveying information in photon streams, comprising:
    producing first and second spatially separated and entangled photon streams, the streams being entangled with respect to polarization, the first and second streams collectively existing in a quantum superposition state by virtue of their mutual entanglement;
    generating a modulation control signal corresponding to the information to be conveyed;
    optically altering the polarization of the first stream based on the control signal, thus encoding information into quantum probability distributions of the superposition state, whereby information is conveyed in the photon streams.

13. The method of claim 12 wherein the first and second photon streams are each substantially continuous.

14. The method of claim 12 wherein the first and second photon streams define a propagating electromagnetic wave and wherein the method further comprises modulating the electromagnetic wave without altering the quantum superposition state.

15. The method of claim 14 wherein the quantum probability distributions of the superposition state carries first information and the modulated electromagnetic wave carries second information.

* * * * *